United States Patent [19]
Komori et al.

[11] Patent Number: 4,923,918
[45] Date of Patent: May 8, 1990

[54] PROCESS FOR PRODUCING MODIFIED PROPYLENE POLYMER COMPOSITION

[75] Inventors: Nobutoshi Komori; Hirokazu Nakazima, both of Chiba, Japan

[73] Assignee: Chisso Corporation, Japan

[21] Appl. No.: 203,822

[22] Filed: Jun. 8, 1988

[30] Foreign Application Priority Data

Jun. 10, 1987 [JP] Japan ................................ 62-144609

[51] Int. Cl.$^5$ .............................................. C08K 5/09
[52] U.S. Cl. .................................... 524/339; 524/351; 524/352; 524/571; 524/574; 524/580; 524/581; 524/583; 525/331.7; 525/333.8; 525/370
[58] Field of Search ............... 524/339, 351, 352, 571, 524/574, 580, 581, 583; 525/370

[56] References Cited

U.S. PATENT DOCUMENTS 4,582,878 4/1986 Chiba et al. ..................... 525/268

FOREIGN PATENT DOCUMENTS 0206413 12/1986 European Pat. Off. .
2152067A 12/1984 United Kingdom .

*Primary Examiner*—Bernard Lipman
*Attorney, Agent, or Firm*—Leydig, Voit & Mayer

[57] ABSTRACT

A process for producing a modified propylene polymer composition is disclosed, which comprises melt-kneading a propylene polymer having a considerable titanium or vanadium content as a catalyst residue and having incorporated therein a phenolic antioxidant in the presence of a radical generator in combination with a specific amount of a zinc salt of a carboxylic acid. The resulting modified propylene polymer composition exhibits freedom from coloring as well as improved moldability.

16 Claims, No Drawings

PROCESS FOR PRODUCING MODIFIED PROPYLENE POLYMER COMPOSITION

FIELD OF THE INVENTION

This invention relates to a process for producing a modified propylene polymer composition. More particularly, it relates to a process for producing a colorless modified propylene polymer composition by melt-kneading a propylene polymer having a considerably high titanium or vanadium content as a catalyst residue and containing a phenolic antioxidant in the presence of a radical generator in combination with a zinc salt of a carboxylic acid.

BACKGROUND OF THE INVENTION

In general, propylene polymers are relatively cheap and have excellent mechanical properties and, therefore, have been used as various articles, such as injection molded articles, blow molded articles, films, sheets, fibers, and the like. However, when a propylene polymer is molded at a temperature above its melting point, it is subject to oxidative deterioration by the heat of melt-kneading. As a result, scission of the molecular chain occurs to reduce processability and mechanical strength, and also problems of coloring and smell arise. Existence of a tertiary carbon atom in the propylene polymer makes the propylene polymer particularly liable to oxidative deterioration during melt-kneading on molding and also makes the propylene polymer unreliable for heat stability on practical use.

Hence, it has been widely adopted to use a low-molecular phenolic antioxidant, e.g., 2,6-di-t-butyl-p-cresol (BHT), in order to prevent oxidative deterioration during melt-kneading, or a high-molecular phenolic antioxidant in order to impart heat stability on practical use.

However, the phenolic antioxidant compounded with a propylene polymer undergoes reaction with a titanium or vanadium complex compound, which is a catalyst residue remaining in the polymer, to form a phenoxy-coordinated complex, or oxidation to form a quinone compound upon melt-kneading of the propylene polymer composition to thereby cause coloring of the polymer composition. In order to cope with this problem, there have hitherto been proposed a polyolefin composition comprising a polyolefin having compounded thereinto a zinc salt of an organic acid as disclosed in *Plastics Age*, Vol. 33, No. 1, pp. 152–159 (1987) and a stabilizer system comprising a phenolic antioxidant and a zinc salt of a carboxylic acid aiming at improved resistance to yellowing and an enhanced stabilizing effect over those attained with a certain concentration of the phenolic antioxidant or a stabilized polymer composition containing such a stabilizer system as disclosed in Japanese Patent Application (OPI) No. 43437/87 (the term "OPI" as used herein means an "unexamined published Japanese patent application").

Further, it is well known that a propylene polymer can be modified so as to have improved moldability by melt-kneading in the presence of a radical generator. In this connection, Japanese Patent Application (OPI) Nos. 131032/80 and 156710/85 proposed a propylene polymer composition comprising a propylene polymer, a radical generator, and, as a lubricant, a zinc salt of a fatty acid for the purpose of further improving moldability of the propylene polymer.

In the course of studies on color protection of propylene polymers having considerable amounts of a titanium or vanadium content as catalyst residue, the inventors have found that incorporation of the above-described phenolic antioxidant into a propylene polymer having a considerable titanium or vanadium content causes no problem of coloring in practical use even when the polymer composition is melt-kneaded, but such a propylene polymer containing the phenolic antioxidant suffers from serious coloring when modified by melt-kneading in the presence of a radical generator. This phenomenon is neither described nor even suggested in any of the above-cited references, i.e., *Plastics Age*, Vol. 33, No. 1, pp. 152 to 159 (1987) and Japanese Patent Application (OPI) Nos. 43437/87, 131032/80 and 156710/85.

In the light of the above-mentioned problems and for the purpose of obtaining a modified propylene polymer composition free from coloring, the inventors previously proposed a process for producing a modified propylene polymer composition which comprises compounding a polyol or a partial ester of a polyol and a fatty acid and a phenolic antioxidant with a propylene polymer and melt-mixture in the presence of a radical kneading the generator as described in Japanese Patent Application (OPI) Nos. 252443/87 and 12650/88.

SUMMARY OF THE INVENTION

Not being thoroughly satisfied with the previous proposals of Japanese Patent Application (OPI) Nos. 252443/87 and 12650/88, the inventors continued further investigations on a process for obtaining a modified propylene polymer composition surely free from coloring by melt-kneading a propylene polymer having a high titanium or vanadium content as catalyst residue and also a phenolic antioxidant even in the presence of a radical generator aiming at improvement of moldability or the like. As a result, it has now been found that the above object can be accomplished by melt-kneading such a propylene polymer in the presence of a radical generator in combination with a specific amount of a zinc salt of a carboxylic acid, and by melt-kneading such a propylene polymer in the presence of a radical generator and again melt-kneading the resulting modified propylene polymer composition in the presence of a specific amount of a zinc salt of a carboxylic acid.

The object of the present invention is to provide a process for producing a modified propylene polymer composition, which comprises compounding from 0.01 to 1 part by weight of a zinc salt of carboxylic acid (hereinafter referred to as Compound A), from 0.01 to 1 part by weight of a phenolic antioxidant, and from 0.001 to 0.5 part by weight of a radical generator with 100 parts by weight of a propylene polymer having 5 ppm or more of a titanium content or 0.5 ppm or more of a vanadium content as a catalyst residue and melt-kneading the resulting mixture at a temperature of from 150° C. to 300° C.

Another object of the present invention is to provide a process for producing a modified propylene polymer composition, which comprises compounding from 0.01 to 1 part by weight of a phenolic antioxidant and from 0.001 to 0.5 part by weight of a radical generator with 100 parts by weight of a propylene polymer having 5 ppm or more of a titanium content or 0.5 ppm or more of a vanadium content as a catalyst residue, melt-kneading the mixture at a temperature of from 150° C. to 300° C., compounding from 0.01 to 1 part by weight of Compound A per 100 parts by weight of the propylene polymer with the resulting modified propylene polymer composition, and again subjecting the resulting mixture to melt-kneading at a temperature of from 150° C. to 300° C.

DETAILED DESCRIPTION OF THE INVENTION

The propylene polymer which can be used in the present invention has 5 ppm or more of a titanium content or 0.5 ppm or more of a vanadium content as a catalyst residue and includes, for example, a propylene polymer obtained by solution polymerization using a saturated hydrocarbon solvent, bulk polymerization, gas phase polymerization, or a combination of bulk polymerization and gas phase polymerization.

The process of the present invention is by no means prohibited from application to a propylene polymer having a titanium content of less than 5 ppm or a vanadium content of less than 0.5 ppm, but in this case a modified propylene polymer composition obtained without compounding Compound A does not suffer so much coloring as to cause a problem in practical use. Therefore, the titanium or vanadium content in the propylene polymer to which the present invention is applied is specified as described above. Specific examples of the propylene polymer to be used include a crystalline propylene homopolymer, a crystalline random or block copolymer comprising propylene and one or more comonomers selected from α-olefins, such as ethylene, butene-1, pentene-1, 4-methyl-pentene-1, hexane-1, octene-1, etc., a copolymer of propylene and vinyl acetate or acrylic ester or a saponification product thereof, each of these copolymers containing at least 70% by weight of a propylene unit, a copolymer of propylene and an unsaturated silane compound, a copolymer of propylene and an unsaturated carboxylic acid or an anhydride thereof or a reaction product thereof with a metal ion compound, and the like. These propylene polymers may be used either individually or in combination of two or more thereof. Further included in the propylene polymer are mixtures of the above-enumerated propylene polymers and various synthetic rubbers (e.g., an ethylene-propylene copolymer rubber, an ethylene-propylene-non-conjugated diene copolymer rubber, polybutadiene, polyisoprene, polychloroprene, chlorinated polyethylene, chlorinated polypropylene, a fluorine-containing rubber, a styrene-butadiene rubber, an acronitrile-butadiene rubber, a styrene-butadiene-styrene block copolymer, a styrene-isoprene-styrene block copolymer, a styrene-ethylene-butylene-styrene block copolymer, a styrene-propylene-butylene-styrene block copolymer, etc.) or thermoplastic synthetic resins (such as polyolefins exclusive of propylene polymers, e.g., ultra-low-density polyethylene, low-density polyethylene, linear low-density polyethylene, medium-density polyethylene, high-density polyethylene, polybutene, poly-4-methyl-pentene-1, etc.; polystyrene, a styrene-acrylonitrile copolymer, an acrylonitrile-butadiene-styrene copolymer, polyamide, polyethylene terephthalate, polybutylene terephthalate, polycarbonate, polyvinyl chloride, a fluorine-containing resin, etc.).

Of these preferred are a crystalline propylene homopolymer, a crystalline ethylene-propylene random copolymer, a crystalline ethylene-propylene block copolymer, a crystalline propylene-butene-1 random copolymer, a crystalline ethylene-propylene-butene-1 terpolymer, a crystalline propylene-hexene-butene-1 terpolymer, and a mixture of two or more thereof, each having a titanium content of 5 ppm or more or a vanadium content of 0.5 ppm or more.

The Compound A which can be used in the present invention preferably includes a zinc salt of a fatty acid, e.g., zinc acetate, zinc n-propionate, zinc n-butyrate, zinc n-valerate, zinc n-hexanoate, zinc n-octanoate, zinc 2-ethylhexanoate, zinc n-decanoate, zinc laurate, zinc myristate, zinc palmitate, zinc stearate, zinc oleate, zinc linoleate, zinc linolenate, zinc behenate, zinc erucate, zinc lignocerate, zinc cerotate, zinc montanate, etc.; zinc triphenylacetate; a zinc salt of an aliphatic dicarboxylic acid, e.g., zinc oxalate, zinc malonate, zinc succinate, zinc glutarate, zinc adipate, etc.; zinc naphtenate and a zinc salt of an aromatic carboxylic acid, e.g., zinc benzoate, zinc o-toluylate, zinc m-toluylate, zinc p-toluylate, zinc p-t-butylbenzoate, zinc o-methoxybenzoate, zinc m-methoxybenzoate, zinc anisate, zinc phthalate, zinc isophthalate, zinc terephthalate, etc., with zinc salts of fatty acids and zinc salts of aromatic carboxylic acids being more preferred. In particular, zinc salts of fatty acids, such as zinc 2-ethylhexanoate, zinc stearate and zinc montanate are preferred. These zinc carboxylates may be used either individually or in combination of two or more thereof.

The phenolic antioxidant which can be used in the present invention specifically includes 2,6-di-t-butyl-p-cresol, 2-t-butyl-4,6-dimethylphenol, 2,6-di-t-butyl-4-ethylphenol, 2,6-di-t-butyl-4-n-butylphenol, 2,6-di-i-butyl-4-n-butylphenol, 2,6-dicyclopentyl-4-methylphenol, 2-(α-methylcyclohexyl)-4,6-dimethylphenol, 2,6-diocta-decyl-4-methsylphenol, 2,4,6-tricyclohexylphenol, 2,6-di-t-butyl-4-methoxymethylphenol, n-octadecyl-β-(4'-hydroxy 3',5'-di-t-butylphenyl)propionate, 2,6-diphenyl-4-octadecyloxyphenol, 2,4,6-tris(3',5'-di-t-butyl-4'-hydroxy-benzylthio)-1, 3,5-triazine, 2,6-di-t-butyl-4-methoxyphenol, 2,5-di t-butylhydroquinone, 2,5-di-t-amylhydroquinone, 2,2'-thiobis(6-t-butyl-4-methylphenol), 2,2'-thiobis(4-octylphenol), 2,2'-thiobis(6-t-butyl-3-methylphenol), 4,4'-thiobis(6-t-butyl-2-methylphenol), 2,2'-methylenebis(6-t-butyl-4-methylphenol), 2,2'-methylenebis(6-t-butyl-4-ethylphenol), 2,2'-methylenebis[4-methyl-6(o-methylcyclohexyl)phenol], 2,2'-methylenebis(4-methyl-6cyclohexylphenol), 2,2'-methylenebis(6-nonyl-4-methylphenol), 2,2'-methylenebis[6-(α-methylbenzyl)-4-nonylphenol], 2,2'-methylenebis[6-(α,α-dimethylbenzyl)-4-nonylphenol], 2,2'-methylenebis(4,6-di-t-butylphenol), 2,2'-ethylidenebis(4,6-di-t-butylphenol), 2,2'-ethylidenebis(6-t-butyl 4-i-butylphenol), 4,4'-methylenebis(2,6-di-t-butylphenol), 4,4'-methylenebis(6-t-butyl-2-methylphenol), 4,4'-butylidenebis(6-t-butyl-2-methylphenol), 4,4'-butylidenebis(6-t-butyl-3-methylphenol), 4,4'-butylidenebis(2,6-di-t-butylphenol), 4,4'-butylidenebis(3,6-di-t-butyl-phenol), 1,1-bis(5-t-butyl-4-hydroxy-2-methylphenyl)butane, 2,6-di(3 t-butyl-5-methyl-2-hydroxybenzyl)-4methylphenol, 1,1,3-tris(5-t-butyl-4 hydroxy-2-methyl-phenyl)-butane, bis[3,3-bis(4'-hydroxy-3'-t-butylphenyl)butyric acid]ethylene glycol ester, di-(3-t-butyl-4-hydroxy-5-methylphenyl)-dicyclopentadiene, di[2-(3'-t-butyl-2'-hydroxy-5'-methylbenzyl)-6-t-butyl-4-methylphenyl]terephthalate, 3,9-bis[1,1-dimethyl-2-{β-3-t-butyl-4-hydroxy-5-methylphenyl)propionyloxy}ethyl]-2,4,8, 10-tetraoxaspiro[5,5]undecane, 3,9-bis[1,1-dimethyl-2-{β-(3, 5-di-t-butyl-4-hydroxyphenyl)propionyloxy}ethyl]-2,4, 8,10- tetraoxaspiro[5,5]undecane, 3,9-bis[1,1-dimethyl-2-{β-(3,5-diphenyl-4 hydroxyphenyl)propionyloxy}ethyl]-2,4,8, 10-tetraoxaspiro[5,5]undecane, 3,9-bis[1,1-dimethyl-2-{β-(3, 5-dicyclohexyl-4-hydroxyphenyl)propionyloxy}-ethyl]-2, 4,8,10-tetraoxaspiro[5,5]undecane, 1,3,5-tri-methyl-2,4,6-tris(3, 5-di-t-butyl-4-hydroxybenzyl)benzene, 1,3,5-tris(3,5-di-t-butyl-4-hydroxybenzyl) isocyanurate, 1,3,5-tris(4-t-butyl-3-hydroxy-2,6-dimethylbenzyl) isocyanurate, 1,3,5-tris[(3,5-di-t-butyl-4-hydroxyphenyl)propionyloxyethyl]isocyanurate, and tetrakis[methylene-3(3',5'-di-t-butyl-4'-hydroxyphenyl)-propionate]methane. In particular, 2,6-di-t-butyl-p-cresol, tetrakis[methylene-3(3',5'-di-t-butyl-4-hydroxyphenyl)propionate]methane, 1,3,5-trimethyl-2,4,6-tris(3,5-di-t-butyl-4-hydroxybenzyl)benzene, 1,3,5-tris(3,5-di-t-butyl-4-hydroxybenzyl) isocyanurate, and n-octadecyl-8-(4'-hydroxy-3',5'-di-t-butylphenyl) propionate are preferred. These phenolic antioxidants may be used either individually or in combination of two or more thereof.

The amount of Compound A to be compounded ranges from 0.01 to 1 part, and preferably from 0.05 to 0.5 part, by weight per 100 parts by weight of the propylene polymer. If it is less than 0.01 part by weight, the effect on prevention of coloring of the modified propylene polymer composition cannot be fully exhibited. Amounts exceeding 1 part by weight not only produce no further improvement but prove false economy.

The phenolic antioxidant is compounded in an amount of from 0.01 to 1 part, and preferably from 0.05 to 0.5 part, by weight per 100 parts by weight of the propylene polymer. Amounts less than 0.01 part are insufficient for producing an effect of preventing heat oxidative deterioration of the modified propylene polymer composition. Amounts exceeding 1 part by weight produce no further improvement and rather prove bad economy.

In order to obtain a uniform composition, the radical generator to be used in the present invention desirably does not have too low a decomposition point. More specifically, a radical generator whose decomposition temperature at which it is reduced to half in 10 hours is at least 70° C., and more preferably at least 100° C., is preferred. Such a radical generator includes organic peroxides, e.g., benzoyl peroxide, t-butyl perbenzoate, t-butyl peracetate, t-butyl peroxyisopropyl carbonate, 2,5-dimethyl-2, 5-di(benzoylperoxy)hexane, 2,5-dimethyl-2,5-di(benzoylperoxy)hexyne-3, t-butyl diperadipate, t-butyl peroxy-3,5,5-trimethylhexanoate, methyl ethyl ketone peroxide, cyclohexanone peroxide, di-t-butyl peroxide, dicumyl peroxide, 2,5-dimethyl-2,5-di(t-butylperoxy)-hexane, 2,5-dimethyl-2,5-di(t-butylperoxy)-hexyne-3, 1,3-bis(t-butylperoxyisopropyl)benzene, t-butylcumyl peroxide, 1,1-bis(t-butylperoxy)-3,3,5-trimethylcyclohexane, 1,1-bis(t-butylperoxy)cyclohexane, 2,2-bis(t-butylperoxy)butane, p-methane hydroperoxide, diisopropylbenzene hydroperoxide, cumene hydroperoxide, t-butyl hydroperoxide, p-cymene hydroperoxide, 1,1,3,3-tetramethylbutyl hydroperoxide, 2,5-dimethyl-2,5-di(hydroperoxy)hexane, etc., with 2,5-dimethyl-2,5,-di(t-butylperoxy)hexane, 2,5-dimethyl-2,5-di(t-butylperoxy)hexyne-3, and 1,3-bis(t-butylperoxyisopropyl)benzene being preferred. These radical generators may be used either individually or in combination of two or more thereof.

The radical generator is used in an amount usually of from 0.001 to 0.5 part, and preferably of from 0.01 to 0.2 part, by weight per 100 parts by weight of the propylene polymer.

The melt-kneading of the propylene polymer can be carried out at a temperature between 150° C. and 300° C., and preferably between 180° C. and 270° C., by the use of various melt-kneading machines or molding machines hereinafter described. If the melt-kneading temperature is lower than 150° C., sufficient modification cannot be achieved. If it exceeds 300° C., heat oxidative deterioration is accelerated, resulting in significant coloring of the modified propylene polymer composition.

In carrying out the present invention, the propylene polymer having a titanium or vanadium catalyst residue may contain various additives commonly employed for propylene-based polymers as long as the compounded additives do not defeat the purpose of the present invention. Such additives include antioxidants (e.g., thioether compounds and phosphorus compounds), light stabilizers, clarifiers, nucleating agents, lubricants, antistatic agents, anti-fogging agents, anti-blocking agents, anti-dripping agents, pigments, heavy metal deactivators (copper inhibitors), dispersing agents or neutralizing agents (such as metallic soaps), inorganic fillers (e.g., talc, mica, clay, wollastonite, zeolite, asbestos, calcium carbonate, aluminum hydroxide, magnesium hydroxide, silicon dioxide, titanium dioxide, zinc oxide, magnesium oxide, zinc sulfide, barium sulfate, calcium silicate, aluminum silicate, glass fibers, potassium titanate, carbon fibers, carbon black, graphite, metallic fibers, etc.), and these inorganic fillers or organic fillers (e.g., woodmeal, pulp, wastepaper, synthetic fibers, natural fibers, etc.) having been treated with finishing agents, such as coupling agents (e.g., silane compounds, titanate compounds, boron compounds, aluminate compounds, zircoaluminate compounds, etc.). In particular, if phosphorus antioxidants are used together with various additives, the synergistic effect on prevention of coloration of the propylene polymer composition can be exhibited. Preferred examples of phosphorus antioxidants include distearyl pentaerythritol diphosphite, tetrakis(2,4-di-t-butylphenyl)-4,4'-biphenylene diphosphonite, bis(2,4-di-t-butylphenyl)-pentaerythritol diphosphite, bis(2,6-di-t-butyl-4-methyl-phenyl)-pentaerythritol diphosphite, and tris(2,4-di-t-butylphenyl) phosphite.

According to the first aspect of the present invention, prescribed amounts of a propylene polymer having 5 ppm or more of a titanium content and 0.5 ppm or more of a vanadium content as a catalyst residue, Compound A, a phenolic antioxidant, a radical generator, and, if any, various additives are mixed in an ordinary mixing apparatus, e.g., Henschel mixer (trade name), a super mixer, a ribbon blender, a Banbury mixer, a tumbler mixer, etc., at a temperature at which the compounded radical generator is not decomposed. The resulting mixture is then melt-kneaded at a temperature of from 150° C. and 300° C., and preferably from 180° C. to 270° C., by means of an ordinary melt-kneading machine, such as a single screw extruder, a twin screw extruder, a Brabender, a roll, etc., to obtain pellets.

According to the second aspect of the present invention, prescribed amounts of a propylene polymer having 5 ppm or more of a titanium content or 0.5 ppm or more of a vanadium content as a catalyst residue, a phenolic antioxidant, a radical generator, and, if any, various additives are mixed in the same mixing apparatus as described above at a temperature at which the radical generator is not decomposed. The resulting mixture is then melt-kneaded at a temperature of from 150° C. to 300° C., and preferably from 180° C. to 270° C., by means of the same melt-kneading machine as described above to obtain pellets. To the pellets is added a prescribed amount of Compound A, and preferably a master batch, such as a mixture and pellets, comprising the propylene polymer having incorporated therein Compound A in a high concentration, by means of the same mixing apparatus as described above, and the resulting mixture is melt-kneaded at a temperature of from 150° C. to 300° C., and preferably from 180° C. to 270° C., by the use of an ordinary melt-kneading machine, e.g., a single screw extruder, a twin screw extruder, a Brabender, a roll, etc., or a molding machine, e.g., a spinning machine, a film-forming machine, a sheet-forming machine, an injection molding machine, a blow molding machine, etc., to thereby prepare pellets or molded articles.

In the present invention, as is well known in the art, the phenolic antioxidant serves as radical chain terminator, and the radical generator produces a radical upon melt-kneading, i.e., heating to cause scission of the main chain of the propylene polymer, thereby reducing the molecular weight of the propylene polymer, which brings about improved moldability.

It has not yet been elucidated in what mechanism the compound A acts on the titanium or vanadium complex compound when the propylene polymer stabilized by the phenolic antioxidant is melt-kneaded in the presence of a radical generator. It may be assumed that the compound A acts on the titanium or vanadium complex compound to form a stable chelate compound, that is, deactivate the active titanium or vanadium and, at the same time, acts on a colored phenoxy-coordinated complex that is formed by the titanium or vanadium complex compound when the propylene polymer stabilized by the phenolic antioxidant is melt-kneaded in the presence of a radical generator whereby titanium or vanadium in the phenoxy-coordinated complex is substituted with zinc in the compound A to form a colorless phenoxy-zinc coordination complex.

The modified propylene polymer composition obtained by the process of the present invention has ensured freedom from coloring and improved moldability over those obtained by the processes previously proposed by the same inventors as disclosed in Japanese Patent Application (OPI) Nos. 252443/87 and 12650/88. Therefore, it is suitable for production of molded articles by various molding methods, such as injection molding, extrusion molding, blow molding, and the like.

The present invention is now illustrated in greater detail with reference to Examples and Comparative Examples, but it should be understood that the present invention is not deemed to be limited thereto. In these examples, all the parts and percents are by weight unless otherwise indicated.

In the examples, the degree of coloring of modified propylene polymer compositions produced was evaluated by determining the yellowness index (YI) of pellets according to JIS K7103. The smaller the YI value, the lower the degree of coloring.

The moldability of modified propylene polymer compositions produced was evaluated by determining the melt flow rate (MFR) of pellets according to JIS K6758. The larger the MFR value, the more improved the moldability.

EXAMPLES 1 TO 15 AND COMPARATIVE EXAMPLES 1 TO 7

To 100 parts of an unstabilized powderous propylene homopolymer having an MFR (flow rate of a molten resin per 10 minutes as measured at 230° C. under a load of 2.16 Kg) of 2.0 g/10 min and having a titanium content of 30 ppm were added prescribed amounts of Compound A selected from zinc 2-ethylhexanoate, zinc stearate, zinc montanate, and zinc benzoate; a phenolic antioxidant selected from 2,6-di-t-butyl-p-cresol, tetrakis[methylene3-(3',5'-di-t-butyl-4'-hydroxyphenyl)-propionate]methane, 1,3,5-trimethyl-2,4,6 tris(3,5-di-t-butyl-4-hydroxybenzyl)benzene, 1,3,5-tris(3,5-di-t-butyl-4-hydroxybenzyl) isocyanurate, and n-octadecyl-8-(4'-hydroxy-3',5'-di-t-butylphenyl) propionate; a radical generator selected from 2,5 dimethyl-2,5-di(t-butylperoxy)hexane and 1,3-bis(t-butyl peroxyisopropyl)benzene, and other additives according to the compounding ratio shown in Table 1 below. After the mixture was stirred with a Henschel mixer (trade name) for 3 minutes, it was melt-kneaded in a 40 mmφ single screw extruder at 200° C. to obtain pellets of a modified propylene polymer composition.

For comparison, pellets of a modified propylene polymer composition were produced in the same manner as in Examples 1 to 15, except for using no Compound A.

The resulting pellets were evaluated for the degree of coloring and moldability in accordance with the above-described methods, and the results obtained are shown in Table 1.

EXAMPLES 16 TO 30 AND COMPARATIVE EXAMPLES 8 TO 14

Pellets of a modified propylene polymer composition were produced in the same manner as in Examples 1 to 15, except that an unstabilized powderous crystalline ethylene-propylene random copolymer having an MFR of 7.0 g/10 min, an ethylene content of 2.5%, and a titanium content of 33 ppm was used as a propylene polymer and the components were mixed according to the compounding ratio of Table 2.

For comparison, pellets of a modified propylene polymer composition were produced in the same manner as in Examples 16 to 30, except for using no Compound A.

The resulting pellets were evaluated for the degree of coloring and moldability according to the above-described test methods. The results obtained are shown in Table 2.

EXAMPLES 31 TO 45 AND COMPARATIVE EXAMPLES 15 TO 21

Pellets of a modified propylene polymer composition were produced in the same manner as in Examples 1 to 15, except that an unstabilized powderous crystalline ethylene-propylene block copolymer having an MFR of 4.0 g/10 min, an ethylene content of 8.5%, and a titanium content of 33 ppm was used as a propylene polymer and the components were mixed according to the compounding ratio shown in Table 3.

For comparison, pellets of a modified propylene polymer composition were produced in the same manner as in Examples 31 to 45, except for using no Compound A.

The resulting pellets were evaluated for the degree of coloring and moldability according to the abovedescribed test methods. The results obtained are shown in Table 3.

EXAMPLES 46 TO 60 AND COMPARATIVE EXAMPLES 22 TO 28

Pellets of a modified propylene polymer composition were produced in the same manner as in Examples 1 to 15, except that an unstabilized powderous crystalline ethylene-propylene-butene-1 terpolymer having an MFR of 7.0 g/10 min, an ethylene content of 2.5%, a butene-1 content of 4.5%, and a titanium content of 33 ppm was used as a propylene polymer and the components were mixed according to the compounding ratio of Table 4.

For comparison, pellets of a modified propylene polymer composition were produced in the same manner as in Examples 46 to 60, except for using no Compound A.

The resulting pellets were evaluated for the degree of coloring and moldability according to the abovedescribed test methods. The results obtained are shown in Table 4.

EXAMPLES 61 TO 75 AND COMPARATIVE EXAMPLES 29 TO 35

Pellets of a modified propylene polymer composition were produced in the same manner as in Examples 1 to 15, except that an unstabilized powderous crystalline ethylene-propylene block copolymer having an MFR of 4.0 g/10 min, an ethylene content of 12.0%, and a vanadium content of 0.6 ppm was used as a propylene polymer and the components were mixed according to the compounding ratio of Table 5.

For comparison, pellets of a modified propylene polymer composition were produced in the same manner as in Examples 61 to 75, except for using no Compound A.

The resulting pellets were evaluated for the degree of coloring and moldability according to the abovedescribed test methods. The results obtained are shown in Table 5.

EXAMPLES 76 TO 90 AND COMPARATIVE EXAMPLES 36 TO 42

To 100 parts of an unstabilized powderous propylene homopolymer having an MFR of 2.0 g/10 min and a titanium content of 30 ppm were added prescribed amounts of a phenolic antioxidant selected from 2,6 di-t-butyl-p-cresol, tetrakis[methylene-3-(3',5'-di-t-butyl-4'hydroxyphenyl)propionate]methane, 1,3,5-trimethyl-2,4,6tris(3,5-di-t-butyl-4-hydroxybenzyl)benzene, 1,3,5tris(3,5-di-t-butyl-4-hydroxybenzyl) isocyanurate, and n-octadecyl-$\beta$(4'-hydroxy-3',5'-di-t-butylphenyl) propionate; a radical generator selected from 2,5-dimethyl-2,5-di(t-butylperoxy)hexane and 1,3-bis(t butylperoxyisopropyl)benzene, and other additives according to the compounding ratio shown in Table 6. After mixing with a Henschel mixer (trade name) for 3 minutes, the mixture was melt-kneaded in a 40 mm$\phi$ single screw extruder at 200° C. to obtain pellets of a modified propylene polymer composition (hereinafter referred to as Pellet I).

To 90 parts of Pellet I were added 10 parts of an unstabilized powderous propylene homopolymer having an MFR of 2.0 g/10 min and a titanium content of 30 ppm and a prescribed amount of Compound A selected from zinc 2-ethylhexanoate, zinc stearate, zinc montanate, and zinc benzoate according to the compounding ratio of Table 6. After stirring with a Henschel mixer (trade name) for 1 minute, the mixture was melt-kneaded in a 40 mm$\phi$ single screw extruder at 200° C. to obtain pellets of a modified propylene polymer composition (hereinafter referred to as Pellet II).

For comparison, Pellets I and II were produced in the same manner as in Examples 76 to 90, except for using no Compound A and using other additives according to the compounding ratio of Table 6.

Each of Pellets I and II thus produced was evaluated for coloring and moldability in accordance with the above-described test methods. The results obtained are shown in Table 6.

EXAMPLES 91 TO 105 AND COMPARATIVE EXAMPLES 43 TO 49

The same procedure as in Examples 76 to 90 was repeated, except that an unstabilized powderous ethylenepropylene block copolymer having an MFR of 4.0 g/10 min, an ethylene content of 12.0%, and a vanadium content of 0.6 ppm was used as a propylene polymer and the components were mixed according to the compounding ratio of Table 7 to prepare Pellets I and II.

For comparison, Pellets I and II were produced in the same manner as in Examples 91 to 105, except for using no Compound A and using other additives according to the compounding ratio of Table 7.

Each of Pellets I and II was evaluated for the degree of coloring and moldability according to the above-described test methods. The results obtained are shown in Table 7.

The compounds and additives shown in Tables 1 to 7 are as follows.

Compound A [I]: Zinc 2-ethylhexanoate
Compound A [II]: Zinc stearate
Compound A [III]: Zinc montanate
Compound A [IV]: Zinc benzoate
Phenolic antioxidant [I]: 2,6-Di-t-butyl-p-cresol
Phenolic antioxidant [II]: Tetrakis[methylene-3-(3',5'-di-t-butyl-4'-hydroxyphenyl)propionate]methane
Phenolic antioxidant [III]: 1,3,5-Trimethyl-2,4,6-tris(3,5-di-t-butyl-4-hydroxybenzyl)benzene
Phenolic antioxidant [IV]: 1,3,5-Tris-(3,5-di-t-butyl-4-hydroxy-benzyl) isocyanurate
Phenolic antioxidant [V]: n-Octadecyl-8-(4'-hydroxy-3',5'-di-t-butylphenyl) propionate
Radical generator [I]: 2,5-Dimethyl-2,5-di(t-butylperoxy)hexane
Radical generator [II]: 1,3-Bis(t-butylperoxyisopropyl)-benzene
Phosphorus antioxidant 1: Tetrakis(2,4-di-t-butylphenyl)-4,4'-bi-phenylene diphosphonite
Phosphorus antioxidant 2: Bis(2,4-di-t-butylphenyl)-pentaerythritol diphosphite
Polyol compound: Pentaerythritol monostearate
Zinc compound: Phosphate compound (a zinc salt of an organophosphoric acid): zinc stearyl phosphate (mixture of a monostearyl phosphate and a distearyl phosphate) "LBT-1830", a trade name produced by Sakai Kagaku Kogyo Co., Ltd.
ZnO: Zinc oxide
ZnS: Zinc sulfide
Mg-St: Magnesium stearate
Ca-St: Calcium stearate

TABLE 1

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| **Composition (part*):** | | | | | | | | | | | | | | | |
| Compound A [I] | 0.05 | — | — | — | 0.05 | — | — | — | — | — | 0.05 | — | — | — | — |
| Compound A [II] | — | 0.05 | — | — | — | 0.05 | — | — | 0.05 | 0.05 | — | 0.05 | — | 0.05 | 0.05 |
| Compound A [III] | — | — | 0.05 | — | — | — | 0.05 | — | — | — | — | — | 0.05 | — | — |
| Compound A [IV] | — | — | — | 0.05 | — | — | — | 0.05 | — | — | — | — | — | — | — |
| Phenolic Antioxidant [I] | 0.1 | 0.1 | 0.1 | 0.1 | 0.1 | 0.1 | 0.1 | 0.1 | — | — | — | — | — | — | — |
| Phenolic Antioxidant [II] | 0.05 | 0.05 | 0.05 | 0.05 | 0.05 | 0.05 | 0.05 | 0.05 | 0.05 | 0.05 | — | — | — | — | — |
| Phenolic Antioxidant [III] | — | — | — | — | — | — | — | — | — | — | 0.05 | 0.05 | 0.05 | — | — |
| Phenolic Antioxidant [IV] | — | — | — | — | — | — | — | — | — | — | — | — | — | 0.05 | — |
| Phenolic Antioxidant [V] | — | — | — | — | — | — | — | — | — | — | — | — | — | — | 0.05 |
| Radical Generator [I] | 0.01 | 0.01 | 0.01 | 0.01 | — | — | — | — | — | — | — | — | — | — | — |
| Radical Generator [II] | — | — | — | — | 0.01 | 0.01 | 0.01 | 0.01 | 0.01 | 0.01 | 0.01 | 0.01 | 0.01 | 0.01 | 0.01 |
| Phosphorus Antioxidant 1 | — | — | — | — | — | — | — | — | 0.05 | — | — | — | — | — | — |
| Phosphorus Antioxidant 2 | — | — | — | — | — | — | — | — | — | 0.05 | — | — | — | — | — |
| Polyol Compound | — | — | — | — | — | — | — | — | — | — | — | — | — | — | — |
| Phosphate Compound | — | — | — | — | — | — | — | — | — | — | — | — | — | — | — |
| ZnO | — | — | — | — | — | — | — | — | — | — | — | — | — | — | — |
| ZnS | — | — | — | — | — | — | — | — | — | — | — | — | — | — | — |
| Mg—St | — | — | — | — | — | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| YI of Pellets (%) | 0.9 | 0.8 | 1.0 | 1.1 | 0.8 | 0.8 | 0.9 | 1.0 | −0.4 | −0.5 | 0.6 | 0.5 | 0.6 | 0.8 | 0.9 |
| MFR of Pellets (g/10 min) | 4.4 | 4.5 | 4.5 | 4.4 | 5.3 | 5.4 | 5.5 | 5.3 | 5.6 | 5.5 | 5.7 | 5.8 | 5.8 | 5.7 | 5.8 |

| | Comparative Example No. | | | | | | |
|---|---|---|---|---|---|---|---|
| | 1 | 2 | 3 | 4 | 5 | 6 | 7 |
| **Composition (part*):** | | | | | | | |
| Compound A [I] | — | — | — | — | — | — | — |
| Compound A [II] | — | — | — | — | — | — | — |
| Compound A [III] | — | — | — | — | — | — | — |
| Compound A [IV] | — | — | — | — | — | — | — |
| Phenolic Antioxidant [I] | — | — | — | — | — | — | — |
| Phenolic Antioxidant [II] | 0.05 | 0.05 | 0.05 | 0.05 | 0.05 | 0.05 | 0.05 |
| Phenolic Antioxidant [III] | — | — | — | — | — | — | — |
| Phenolic Antioxidant [IV] | — | — | — | — | — | — | — |
| Phenolic Antioxidant [V] | — | — | — | — | — | — | — |
| Radical Generator [I] | — | — | — | — | — | — | — |
| Radical Generator [II] | 0.01 | 0.01 | 0.01 | 0.01 | 0.01 | 0.01 | 0.01 |
| Phosphorus Antioxidant 1 | 0.05 | — | — | — | — | — | — |
| Phosphorus Antioxidant 2 | — | 0.05 | — | — | — | — | — |
| Polyol Compound | — | — | 0.05 | — | — | — | — |
| Phosphate Compound | — | — | — | 0.05 | — | — | — |
| ZnO | — | — | — | — | 0.05 | — | — |
| ZnS | — | — | — | — | — | 0.05 | — |
| Mg—St | — | — | — | — | — | — | 0.05 |
| Ca—St | 0.1 | 0.1 | 0.1 | 0.1 | 0.1 | 0.1 | 0.1 |
| YI of Pellets (%) | 8.3 | 8.4 | 2.1 | 9.5 | 9.6 | 8.0 | 9.8 |
| MFR of Pellets (g/10 min) | 5.6 | 5.6 | 5.8 | 5.8 | 5.7 | 5.7 | 5.8 |

Note: *Part(s) by weight per 100 parts by weight of a propylene polymer

TABLE 2

| | Example No. | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| **Composition (part*):** | | | | | | | | | | | | | | | |
| Compound A [I] | 0.05 | — | — | — | 0.05 | — | — | — | — | — | 0.05 | — | — | — | — |
| Compound A [II] | — | 0.05 | — | — | — | 0.05 | — | — | 0.05 | 0.05 | — | 0.05 | — | 0.05 | 0.05 |
| Compound A [III] | — | — | 0.05 | — | — | — | 0.05 | — | — | — | — | — | 0.05 | — | — |

TABLE 2-continued

| | | | | | | | | | | | | | | | |
|---|---|---|---|---|---|---|---|---|---|---|---|---|---|---|---|
| Compound A [IV] | — | — | — | 0.05 | — | — | — | 0.05 | — | — | — | — | — | — | — |
| Phenolic Antioxidant [I] | 0.1 | 0.1 | 0.1 | 0.1 | 0.1 | 0.1 | 0.1 | 0.1 | — | — | — | — | — | — | — |
| Phenolic Antioxidant [II] | 0.05 | 0.05 | 0.05 | 0.05 | 0.05 | 0.05 | 0.05 | 0.05 | 0.05 | 0.05 | — | — | — | — | — |
| Phenolic Antioxidant [III] | — | — | — | — | — | — | — | — | — | — | 0.05 | 0.05 | 0.05 | — | — |
| Phenolic Antioxidant [IV] | — | — | — | — | — | — | — | — | — | — | — | — | — | 0.05 | — |
| Phenolic Antioxidant [V] | — | — | — | — | — | — | — | — | — | — | — | — | — | — | 0.05 |
| Radical Generator [I] | 0.01 | 0.01 | 0.01 | 0.01 | — | — | — | — | — | — | — | — | — | — | — |
| Radical Generator [II] | — | — | — | — | 0.01 | 0.01 | 0.01 | 0.01 | 0.01 | 0.01 | 0.01 | 0.01 | 0.01 | 0.01 | 0.01 |
| Phosphorus Antioxidant 1 | — | — | — | — | — | — | — | 0.05 | — | — | — | — | — | — | — |
| Phosphorus Antioxidant 2 | — | — | — | — | — | — | — | — | 0.05 | — | — | — | — | — | — |
| Polyol Compound | — | — | — | — | — | — | — | — | — | — | — | — | — | — | — |
| Phosphate Compound | — | — | — | — | — | — | — | — | — | — | — | — | — | — | — |
| ZnO | — | — | — | — | — | — | — | — | — | — | — | — | — | — | — |
| ZnS | — | — | — | — | — | — | — | — | — | — | — | — | — | — | — |
| Mg—St | — | — | — | — | — | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| YI of Pellets (%) | 1.0 | 1.0 | 1.1 | 1.3 | 0.9 | 0.8 | 1.0 | 1.1 | −0.2 | −0.3 | 0.7 | 0.6 | 0.8 | 0.8 | 1.0 |
| MFR of Pellets (g/10 min) | 15.7 | 15.8 | 15.8 | 15.8 | 19.6 | 19.9 | 20.1 | 20.0 | 20.5 | 20.2 | 21.0 | 21.1 | 21.0 | 20.8 | 20.9 |

| | Comparative Example No. | | | | | | |
|---|---|---|---|---|---|---|---|
| | 8 | 9 | 10 | 11 | 12 | 13 | 14 |
| Composition (part*): | | | | | | | |
| Compound A [I] | — | — | — | — | — | — | — |
| Compound A [II] | — | — | — | — | — | — | — |
| Compound A [III] | — | — | — | — | — | — | — |
| Compound A [IV] | — | — | — | — | — | — | — |
| Phenolic Antioxidant [I] | — | — | — | — | — | — | — |
| Phenolic Antioxidant [II] | 0.05 | 0.05 | 0.05 | 0.05 | 0.05 | 0.05 | 0.05 |
| Phenolic Antioxidant [III] | — | — | — | — | — | — | — |
| Phenolic Antioxidant [IV] | — | — | — | — | — | — | — |
| Phenolic Antioxidant [V] | — | — | — | — | — | — | — |
| Radical Generator [I] | — | — | — | — | — | — | — |
| Radical Generator [II] | 0.01 | 0.01 | 0.01 | 0.01 | 0.01 | 0.01 | 0.01 |
| Phosphorus Antioxidant 1 | 0.05 | — | — | — | — | — | — |
| Phosphorus Antioxidant 2 | — | 0.05 | — | — | — | — | — |
| Polyol Compound | — | — | 0.05 | — | — | — | — |
| Phosphate Compound | — | — | — | 0.05 | — | — | — |
| ZnO | — | — | — | — | 0.05 | — | — |
| ZnS | — | — | — | — | — | 0.05 | — |
| Mg—St | — | — | — | — | — | — | 0.05 |
| Ca—St | 0.1 | 0.1 | 0.1 | 0.1 | 0.1 | 0.1 | 0.1 |
| YI of Pellets (%) | 8.5 | 8.5 | 2.2 | 9.6 | 9.8 | 8.2 | 9.9 |
| MFR of Pellets (g/10 min) | 20.8 | 20.5 | 20.9 | 20.8 | 20.7 | 20.5 | 20.7 |

Note: *Part(s) by weight per 100 parts by weight of a propylene polymer

TABLE 3

| | Example No. | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Composition (part*): | | | | | | | | | | | | | | | |
| Compound A [I] | 0.05 | — | — | — | 0.05 | — | — | — | — | — | 0.05 | — | — | — | — |
| Compound A [II] | — | 0.05 | — | — | — | 0.05 | — | — | 0.05 | 0.05 | — | 0.05 | — | 0.05 | 0.05 |
| Compound A [III] | — | — | 0.05 | — | — | — | 0.05 | — | — | — | — | — | 0.05 | — | — |
| Compound A [IV] | — | — | — | 0.05 | — | — | — | 0.05 | — | — | — | — | — | — | — |
| Phenolic Antioxidant [I] | 0.1 | 0.1 | 0.1 | 0.1 | 0.1 | 0.1 | 0.1 | 0.1 | — | — | — | — | — | — | — |
| Phenolic Antioxidant [II] | 0.05 | 0.05 | 0.05 | 0.05 | 0.05 | 0.05 | 0.05 | 0.05 | 0.05 | 0.05 | — | — | — | — | — |
| Phenolic Antioxidant [III] | — | — | — | — | — | — | — | — | — | — | 0.05 | 0.05 | 0.05 | — | — |

TABLE 3-continued

|  |  |  |  |  |  |  |  |  |  |  |  |  |  |  |  |
|---|---|---|---|---|---|---|---|---|---|---|---|---|---|---|---|
| Phenolic Antioxidant [IV] | — | — | — | — | — | — | — | — | — | — | — | — | — | 0.05 | — |
| Phenolic Antioxidant [V] | — | — | — | — | — | — | — | — | — | — | — | — | — | — | 0.05 |
| Radical Generator [I] | 0.01 | 0.01 | 0.01 | 0.01 | — | — | — | — | — | — | — | — | — | — | — |
| Radical Generator [II] | — | — | — | — | 0.01 | 0.01 | 0.01 | 0.01 | 0.01 | 0.01 | 0.01 | 0.01 | 0.01 | 0.01 | 0.01 |
| Phosphorus Antioxidant 1 | — | — | — | — | — | — | — | — | 0.05 | — | — | — | — | — | — |
| Phosphorus Antioxidant 2 | — | — | — | — | — | — | — | — | — | 0.05 | — | — | — | — | — |
| Polyol Compound | — | — | — | — | — | — | — | — | — | — | — | — | — | — | — |
| Phosphate Compound | — | — | — | — | — | — | — | — | — | — | — | — | — | — | — |
| ZnO | — | — | — | — | — | — | — | — | — | — | — | — | — | — | — |
| ZnS | — | — | — | — | — | — | — | — | — | — | — | — | — | — | — |
| Mg—St | — | — | — | — | — | — | — | — | — | — | — | — | — | — | — |
| Ca—St | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| YI of Pellets (%) | 1.1 | 1.0 | 1.2 | 1.3 | 1.0 | 1.0 | 1.2 | 1.2 | −0.2 | −0.2 | 0.8 | 0.7 | 0.8 | 0.9 | 1.0 |
| MFR of Pellets (g/10 min) | 8.5 | 8.8 | 8.7 | 8.5 | 10.3 | 10.5 | 10.6 | 10.2 | 10.8 | 10.7 | 10.9 | 10.8 | 10.9 | 10.7 | 10.9 |

|  | Comparative Example No. |  |  |  |  |  |  |
|---|---|---|---|---|---|---|---|
|  | 15 | 16 | 17 | 18 | 19 | 20 | 21 |
| Composition (part*): |  |  |  |  |  |  |  |
| Compound A [I] | — | — | — | — | — | — | — |
| Compound A [II] | — | — | — | — | — | — | — |
| Compound A [III] | — | — | — | — | — | — | — |
| Compound A [IV] | — | — | — | — | — | — | — |
| Phenolic Antioxidant [I] | — | — | — | — | — | — | — |
| Phenolic Antioxidant [II] | 0.05 | 0.05 | 0.05 | 0.05 | 0.05 | 0.05 | 0.05 |
| Phenolic Antioxidant [III] | — | — | — | — | — | — | — |
| Phenolic Antioxidant [IV] | — | — | — | — | — | — | — |
| Phenolic Antioxidant [V] | — | — | — | — | — | — | — |
| Radical Generator [I] | — | — | — | — | — | — | — |
| Radical Generator [II] | 0.01 | 0.01 | 0.01 | 0.01 | 0.01 | 0.01 | 0.01 |
| Phosphorus Antioxidant 1 | 0.05 | — | — | — | — | — | — |
| Phosphorus Antioxidant 2 | — | 0.05 | — | — | — | — | — |
| Polyol Compound | — | — | 0.05 | — | — | — | — |
| Phosphate Compound | — | — | — | 0.05 | — | — | — |
| ZnO | — | — | — | — | 0.05 | — | — |
| ZnS | — | — | — | — | — | 0.05 | — |
| Mg—St | — | — | — | — | — | — | 0.05 |
| Ca—St | 0.1 | 0.1 | 0.1 | 0.1 | 0.1 | 0.1 | 0.1 |
| YI of Pellets (%) | 8.4 | 8.5 | 2.3 | 9.6 | 9.9 | 8.3 | 9.9 |
| MFR of Pellets (g/10 min) | 10.5 | 10.6 | 10.8 | 10.6 | 10.5 | 10.6 | 10.9 |

Note: *Part(s) by weight per 100 parts by weight of a propylene polymer

TABLE 4

|  | Example No. |  |  |  |  |  |  |  |  |  |  |  |  |  |  |
|---|---|---|---|---|---|---|---|---|---|---|---|---|---|---|---|
|  | 46 | 47 | 48 | 49 | 50 | 51 | 52 | 53 | 54 | 55 | 56 | 57 | 58 | 59 | 60 |
| Composition (part*): |  |  |  |  |  |  |  |  |  |  |  |  |  |  |  |
| Compound A [I] | 0.05 | — | — | — | 0.05 | — | — | — | — | — | 0.05 | — | — | — | — |
| Compound A [II] | — | 0.05 | — | — | — | 0.05 | — | — | 0.05 | 0.05 | — | 0.05 | — | 0.05 | 0.05 |
| Compound A [III] | — | — | 0.05 | — | — | — | 0.05 | — | — | — | — | — | 0.05 | — | — |
| Compound A [IV] | — | — | — | 0.05 | — | — | — | 0.05 | — | — | — | — | — | — | — |
| Phenolic Antioxidant [I] | 0.1 | 0.1 | 0.1 | 0.1 | 0.1 | 0.1 | 0.1 | 0.1 | — | — | — | — | — | — | — |
| Phenolic Antioxidant [II] | 0.05 | 0.05 | 0.05 | 0.05 | 0.05 | 0.05 | 0.05 | 0.05 | 0.05 | 0.05 | — | — | — | — | — |
| Phenolic Antioxidant [III] | — | — | — | — | — | — | — | — | — | — | 0.05 | 0.05 | 0.05 | — | — |
| Phenolic Antioxidant [IV] | — | — | — | — | — | — | — | — | — | — | — | — | — | 0.05 | — |
| Phenolic Antioxidant [V] | — | — | — | — | — | — | — | — | — | — | — | — | — | — | 0.05 |
| Radical Generator [I] | 0.01 | 0.01 | 0.01 | 0.01 | — | — | — | — | — | — | — | — | — | — | — |
| Radical Generator [II] | — | — | — | — | 0.01 | 0.01 | 0.01 | 0.01 | 0.01 | 0.01 | 0.01 | 0.01 | 0.01 | 0.01 | 0.01 |

TABLE 4-continued

| | | | | | | | | | | | | | | | |
|---|---|---|---|---|---|---|---|---|---|---|---|---|---|---|---|
| Generator [II] | | | | | | | | | | | | | | | |
| Phosphorus Antioxidant 1 | — | — | — | — | — | — | — | — | 0.05 | — | — | — | — | — | — |
| Phosphorus Antioxidant 2 | — | — | — | — | — | — | — | — | — | 0.05 | — | — | — | — | — |
| Polyol Compound | — | — | — | — | — | — | — | — | — | — | — | — | — | — | — |
| Phosphate Compound | — | — | — | — | — | — | — | — | — | — | — | — | — | — | — |
| ZnO | — | — | — | — | — | — | — | — | — | — | — | — | — | — | — |
| ZnS | — | — | — | — | — | — | — | — | — | — | — | — | — | — | — |
| Mg—St | — | — | — | — | — | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| YI of Pellets (%) | 1.0 | 1.1 | 1.3 | 1.2 | 1.0 | 1.0 | 1.1 | 1.1 | −0.3 | −0.4 | 0.7 | 0.6 | 0.8 | 0.7 | 1.0 |
| MFR of Pellets (g/10 min) | 16.2 | 16.5 | 16.3 | 16.4 | 20.2 | 20.5 | 20.6 | 20.4 | 20.8 | 20.7 | 20.9 | 20.6 | 20.9 | 21.0 | 21.1 |

| | Comparative Example No. | | | | | | |
|---|---|---|---|---|---|---|---|
| | 22 | 23 | 24 | 25 | 26 | 27 | 28 |
| Composition (part*): | | | | | | | |
| Compound A [I] | — | — | — | — | — | — | — |
| Compound A [II] | — | — | — | — | — | — | — |
| Compound A [III] | — | — | — | — | — | — | — |
| Compound A [IV] | — | — | — | — | — | — | — |
| Phenolic Antioxidant [I] | — | — | — | — | — | — | — |
| Phenolic Antioxidant [II] | 0.05 | 0.05 | 0.05 | 0.05 | 0.05 | 0.05 | 0.05 |
| Phenolic Antioxidant [III] | — | — | — | — | — | — | — |
| Phenolic Antioxidant [IV] | — | — | — | — | — | — | — |
| Phenolic Antioxidant [V] | — | — | — | — | — | — | — |
| Radical Generator [I] | — | — | — | — | — | — | — |
| Radical Generator [II] | 0.01 | 0.01 | 0.01 | 0.01 | 0.01 | 0.01 | 0.01 |
| Phosphorous Antioxidant 1 | 0.05 | — | — | — | — | — | — |
| Phosphorus Antioxidant 2 | — | 0.05 | — | — | — | — | — |
| Polyol Compound | — | — | 0.05 | — | — | — | — |
| Phosphate Compound | — | — | — | 0.05 | — | — | — |
| ZnO | — | — | — | — | 0.05 | — | — |
| ZnS | — | — | — | — | — | 0.05 | — |
| Mg—St | — | — | — | — | — | — | 0.05 |
| Ca—St | 0.1 | 0.1 | 0.1 | 0.1 | 0.1 | 0.1 | 0.1 |
| YI of Pellets (%) | 8.3 | 8.4 | 2.2 | 9.5 | 9.8 | 8.4 | 9.8 |
| MFR of Pellets (g/10 min) | 20.6 | 20.5 | 20.7 | 20.9 | 20.9 | 20.6 | 20.8 |

Note: *Part(s) by weight per 100 parts by weight of a propylene polymer

TABLE 5

| | Example No. | | | | | | | | | | | | | | |
|---|---|---|---|---|---|---|---|---|---|---|---|---|---|---|---|
| | 61 | 62 | 63 | 64 | 65 | 66 | 67 | 68 | 69 | 70 | 71 | 72 | 73 | 74 | 75 |
| Composition (part*): | | | | | | | | | | | | | | | |
| Compound A [I] | 0.05 | — | — | — | 0.05 | — | — | — | — | — | 0.05 | — | — | — | — |
| Compound A [II] | — | 0.05 | — | — | — | 0.05 | — | — | 0.05 | 0.05 | — | 0.05 | — | 0.05 | 0.05 |
| Compound A [III] | — | — | 0.05 | — | — | — | 0.05 | — | — | — | — | — | 0.05 | — | — |
| Compound A [IV] | — | — | — | 0.05 | — | — | — | 0.05 | — | — | — | — | — | — | — |
| Phenolic Antioxidant [I] | 0.1 | 0.1 | 0.1 | 0.1 | 0.1 | 0.1 | 0.1 | 0.1 | — | — | — | — | — | — | — |
| Phenolic Antioxidant [II] | 0.05 | 0.05 | 0.05 | 0.05 | 0.05 | 0.05 | 0.05 | 0.05 | — | 0.05 | — | — | — | — | — |
| Phenolic Antioxidant [III] | — | — | — | — | — | — | — | — | — | — | 0.05 | 0.05 | 0.05 | — | — |
| Phenolic Antioxidant [IV] | — | — | — | — | — | — | — | — | — | — | — | — | — | 0.05 | — |
| Phenolic Antioxidant [V] | — | — | — | — | — | — | — | — | — | — | — | — | — | — | 0.05 |
| Radical Generator [I] | 0.01 | 0.01 | 0.01 | 0.01 | — | — | — | — | — | — | — | — | — | — | — |
| Radical Generator [II] | — | — | — | — | 0.01 | 0.01 | 0.01 | 0.01 | 0.01 | 0.01 | 0.01 | 0.01 | 0.01 | 0.01 | 0.01 |
| Phosphorous Antioxidant 1 | — | — | — | — | — | — | — | — | 0.05 | — | — | — | — | — | — |
| Phosphorous Antioxidant 2 | — | — | — | — | — | — | — | — | — | 0.05 | — | — | — | — | — |
| Polyol Compound | — | — | — | — | — | — | — | — | — | — | — | — | — | — | — |
| Phosphate Compound | — | — | — | — | — | — | — | — | — | — | — | — | — | — | — |

TABLE 5-continued

| | | | | | | | | | | | | | | | |
|---|---|---|---|---|---|---|---|---|---|---|---|---|---|---|---|
| ZnO | — | — | — | — | — | — | — | — | — | — | — | — | — | — | — |
| ZnS | — | — | — | — | — | — | — | — | — | — | — | — | — | — | — |
| Mg—St | — | — | — | — | — | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| YI of Pellets (%) | 1.2 | 1.1 | 1.3 | 1.5 | 1.0 | 1.0 | 1.3 | 1.4 | −0.1 | −0.2 | 0.8 | 0.8 | 0.9 | 1.0 | 1.0 |
| MFR of Pellets (g/10 min) | 8.2 | 8.4 | 8.5 | 8.4 | 10.0 | 10.1 | 10.1 | 10.0 | 10.5 | 10.4 | 11.0 | 11.1 | 10.9 | 10.5 | 10.9 |

| | Comparative Example No. | | | | | | |
|---|---|---|---|---|---|---|---|
| | 29 | 30 | 31 | 32 | 33 | 34 | 35 |
| Composition (part*): | | | | | | | |
| Compound A [I] | — | — | — | — | — | — | — |
| Compound A [II] | — | — | — | — | — | — | — |
| Compound A [III] | — | — | — | — | — | — | — |
| Compound A [IV] | — | — | — | — | — | — | — |
| Phenolic Antioxidant [I] | — | — | — | — | — | — | — |
| Phenolic Antioxidant [II] | 0.05 | 0.05 | 0.05 | 0.05 | 0.05 | 0.05 | 0.05 |
| Phenolic Antioxidant [III] | — | — | — | — | — | — | — |
| Phenolic Antioxidant [IV] | — | — | — | — | — | — | — |
| Phenolic Antioxidant [V] | — | — | — | — | — | — | — |
| Radical Generator [I] | — | — | — | — | — | — | — |
| Radical Generator [II] | 0.01 | 0.01 | 0.01 | 0.01 | 0.01 | 0.01 | 0.01 |
| Phosphorous Antioxidant 1 | 0.05 | — | — | — | — | — | — |
| Phosphorus Antioxidant 2 | — | 0.05 | — | — | — | — | — |
| Polyol Compound | — | — | 0.05 | — | — | — | — |
| Phosphate Compound | — | — | — | 0.05 | — | — | — |
| ZnO | — | — | — | — | 0.05 | — | — |
| ZnS | — | — | — | — | — | 0.05 | — |
| Mg—St | — | — | — | — | — | — | 0.05 |
| Ca—St | 0.1 | 0.1 | 0.1 | 0.1 | 0.1 | 0.1 | 0.1 |
| YI of Pellets (%) | 8.6 | 8.5 | 2.5 | 9.8 | 10.1 | 8.5 | 10.2 |
| MFR of Pellet (g/10 min) | 10.8 | 10.6 | 10.5 | 10.9 | 10.9 | 10.6 | 10.7 |

Note:
*Part(s) by weight per 100 parts by weight of a propylene polymer

TABLE 6

| Composition-1 (part*): | Example No. | | | | | | | | | | | | | | | Comparative Example No. | | | | | | |
|---|---|---|---|---|---|---|---|---|---|---|---|---|---|---|---|---|---|---|---|---|---|---|
| | 76 | 77 | 78 | 79 | 80 | 81 | 82 | 83 | 84 | 85 | 86 | 87 | 88 | 89 | 90 | 36 | 37 | 38 | 39 | 40 | 41 | 42 |
| Phenolic Antioxidant [I] | 0.1 | 0.1 | 0.1 | 0.1 | 0.1 | 0.1 | 0.1 | 0.1 | — | — | — | — | — | — | — | — | — | — | — | — | — | — |
| Phenolic Antioxidant [II] | 0.05 | 0.05 | 0.05 | 0.05 | 0.05 | 0.05 | 0.05 | 0.05 | 0.05 | — | — | — | — | — | — | 0.05 | 0.05 | 0.05 | 0.05 | 0.05 | 0.05 | 0.05 |
| Phenolic Antioxidant [III] | — | — | — | — | — | — | — | — | — | — | 0.05 | 0.05 | 0.05 | — | — | — | — | — | — | — | — | — |
| Phenolic Antioxidant [IV] | — | — | — | — | — | — | — | — | — | 0.05 | — | — | — | 0.05 | — | — | — | — | — | — | — | — |
| Phenolic Antioxidant [V] | — | — | — | — | — | — | — | — | — | — | — | — | — | — | 0.05 | — | — | — | — | — | — | — |
| Radical Generator [I] | 0.01 | 0.01 | 0.01 | — | — | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Radical Generator [II] | — | — | — | 0.01 | 0.01 | — | — | — | — | — | — | — | — | — | — | — | — | — | — | — | — | — |
| Phosphorous Antioxidant 1 | — | — | — | — | — | — | 0.05 | — | 0.05 | — | — | — | — | — | — | — | — | — | — | — | — | — |
| Phosphorous Antioxidant 2 | — | — | — | — | — | 0.05 | — | 0.05 | — | 0.05 | — | 0.05 | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Composition-2 (part**): | | | | | | | | | | | | | | | | | | | | | | |
| Compound A [I] | 0.05 | — | — | — | 0.05 | — | — | — | — | — | 0.05 | — | — | — | — | — | — | — | — | — | — | — |
| Compound A [II] | — | 0.05 | — | — | — | 0.05 | — | — | 0.05 | 0.05 | — | 0.05 | — | 0.05 | 0.05 | — | — | — | — | — | — | — |
| Compound A [III] | — | — | 0.05 | — | — | — | 0.05 | — | — | — | — | — | 0.05 | — | — | — | — | — | — | — | — | — |
| Compound A [IV] | — | — | — | 0.05 | — | — | — | 0.05 | — | — | — | — | — | — | — | — | — | — | — | — | — | — |
| Phosphorus Antioxidant 1 | — | — | — | — | — | — | — | — | — | — | — | — | — | — | — | 0.05 | — | — | — | — | — | — |
| Phosphorus Antioxidant 2 | — | — | — | — | — | — | — | — | — | — | — | — | — | — | — | — | 0.05 | — | — | — | — | — |
| Polyol Compound | — | — | — | — | — | — | — | — | — | — | — | — | — | — | — | — | — | 0.05 | — | — | — | — |
| Phosphate Compound | — | — | — | — | — | — | — | — | — | — | — | — | — | — | — | — | — | — | 0.05 | — | — | — |
| ZnO | — | — | — | — | — | — | — | — | — | — | — | — | — | — | — | — | — | — | — | 0.05 | — | — |
| ZnS | — | — | — | — | — | — | — | — | — | — | — | — | — | — | — | — | — | — | — | — | 0.05 | — |
| Mg—St | — | — | — | — | — | — | — | — | — | — | — | — | — | — | — | — | — | — | — | — | — | 0.05 |
| YI of Pellet I (%) | 9.2 | 9.2 | 9.2 | 9.2 | 9.0 | 9.0 | 9.0 | 9.0 | 8.3 | 8.4 | 8.8 | 8.8 | 8.8 | 8.9 | 9.0 | 9.2 | 9.2 | 9.2 | 9.2 | 9.2 | 9.2 | 9.2 |
| YI of Pellet II (%) | 4.1 | 4.0 | 4.2 | 4.4 | 3.9 | 3.8 | 3.9 | 4.0 | 3.1 | 3.0 | 3.7 | 3.6 | 3.8 | 3.8 | 3.9 | 13.3 | 13.2 | 12.8 | 13.0 | 11.3 | 9.4 | 13.2 |
| MFR of Pellets I (g/10 min) | 4.4 | 4.4 | 4.4 | 4.4 | 5.3 | 5.3 | 5.3 | 5.3 | 5.5 | 5.4 | 5.5 | 5.5 | 5.5 | 5.6 | 5.6 | 5.6 | 5.6 | 5.6 | 5.6 | 5.6 | 5.6 | 5.6 |
| MFR of Pellets II (g/10 min) | 4.8 | 4.9 | 4.9 | 4.9 | 5.8 | 5.9 | 6.0 | 5.8 | 5.9 | 5.9 | 5.8 | 5.9 | 6.0 | 6.1 | 6.3 | 6.0 | 5.9 | 6.2 | 6.1 | 6.2 | 6.2 | 6.3 |

Note:
*Part(s) by weight per 100 parts by weight of Pellet I.
**Part(s) by weight per 100 parts by weight of Pellet II.

TABLE 7

| | Example No. | | | | | | | | | | | | | | | Comparative Example No. | | | | | | |
|---|---|---|---|---|---|---|---|---|---|---|---|---|---|---|---|---|---|---|---|---|---|---|
| | 91 | 92 | 93 | 94 | 95 | 96 | 97 | 98 | 99 | 100 | 101 | 102 | 103 | 104 | 105 | 43 | 44 | 45 | 46 | 47 | 48 | 49 |
| **Composition-1 (part*):** | | | | | | | | | | | | | | | | | | | | | | |
| Phenolic Antioxidant [I] | 0.1 | 0.1 | 0.1 | 0.1 | 0.1 | 0.1 | 0.1 | 0.1 | — | — | — | — | — | — | — | — | — | — | — | — | — | — |
| Phenolic Antioxidant [II] | 0.05 | 0.05 | 0.05 | 0.05 | 0.05 | 0.05 | 0.05 | 0.05 | 0.05 | 0.05 | 0.05 | 0.05 | — | — | — | 0.05 | 0.05 | 0.05 | 0.05 | 0.05 | 0.05 | 0.05 |
| Phenolic Antioxidant [III] | — | — | — | — | — | — | — | — | — | — | — | — | 0.05 | — | — | — | — | — | — | — | — | — |
| Phenolic Antioxidant [IV] | — | — | — | — | — | — | — | — | — | — | — | — | — | 0.05 | — | — | — | — | — | — | — | — |
| Phenolic Antioxidant [V] | — | — | — | — | — | — | — | — | — | — | — | — | — | — | 0.05 | — | — | — | — | — | — | — |
| Radical Generator [I] | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Radical Generator [II] | — | — | — | — | — | — | — | — | — | — | — | — | — | — | — | — | — | — | — | — | — | — |
| Phosphorus Antioxidant 1 | — | — | — | — | — | — | — | — | 0.05 | — | — | — | — | — | — | — | — | — | — | — | — | — |
| Phosphorus Antioxidant 2 | — | — | — | — | — | — | — | — | — | 0.05 | — | — | — | — | — | — | — | — | — | — | — | — |
| Ca—St | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Composition-2 (part):** | | | | | | | | | | | | | | | | | | | | | | |
| Compound A [I] | 0.05 | — | — | — | — | — | — | — | — | 0.05 | — | — | — | — | — | — | — | — | — | — | — | — |
| Compound A [II] | — | 0.05 | — | — | 0.05 | — | — | — | 0.05 | — | 0.05 | — | — | — | — | — | — | — | — | — | — | — |
| Compound A [III] | — | — | 0.05 | — | — | 0.05 | — | — | — | — | — | 0.05 | 0.05 | 0.05 | 0.05 | — | — | — | — | — | — | — |
| Compound A [IV] | — | — | — | 0.05 | — | — | 0.05 | 0.05 | — | — | — | — | — | — | — | — | — | — | — | — | — | — |
| Phosphorus Antioxidant 1 | — | — | — | — | — | — | — | — | — | — | — | — | — | — | — | 0.05 | — | — | — | — | — | — |
| Phosphorus Antioxidant 2 | — | — | — | — | — | — | — | — | — | — | — | — | — | — | — | — | — | — | — | — | — | — |
| Polyol Compound | — | — | — | — | — | — | — | — | — | — | — | — | — | — | — | — | 0.05 | — | — | — | — | — |
| Phosphate Compound | — | — | — | — | — | — | — | — | — | — | — | — | — | — | — | — | — | 0.05 | — | — | — | — |
| ZnO | — | — | — | — | — | — | — | — | — | — | — | — | — | — | — | — | — | — | 0.05 | — | — | — |
| ZnS | — | — | — | — | — | — | — | — | — | — | — | — | — | — | — | — | — | — | — | 0.05 | — | — |
| Mg—St | — | — | — | — | — | — | — | — | — | — | — | — | — | — | — | — | — | — | — | — | 0.05 | 0.05 |
| YI of Pellet I (%) | 9.5 | 9.5 | 9.5 | 9.5 | 9.2 | 9.2 | 9.2 | 9.2 | 8.6 | 8.5 | 9.0 | 9.0 | 9.0 | 9.1 | 9.2 | 9.4 | 9.4 | 9.4 | 9.4 | 9.4 | 9.4 | 9.4 |
| YI of Pellet II (%) | 4.2 | 4.1 | 4.3 | 4.5 | 3.9 | 3.8 | 4.0 | 4.2 | 3.3 | 3.2 | 3.8 | 3.6 | 3.9 | 3.8 | 4.0 | 13.5 | 13.3 | 12.9 | 13.3 | 11.5 | 9.5 | 13.3 |
| MFR of Pellets I (g/10 min) | 8.2 | 8.2 | 8.2 | 8.2 | 10.1 | 10.1 | 10.1 | 10.1 | 10.3 | 10.4 | 10.3 | 10.3 | 10.3 | 10.5 | 10.6 | 10.4 | 10.4 | 10.4 | 10.4 | 10.4 | 10.4 | 10.4 |
| MFR of Pellets II (g/10 min) | 8.9 | 9.0 | 9.0 | 9.1 | 10.9 | 11.0 | 11.1 | 11.3 | 11.0 | 11.2 | 11.1 | 11.3 | 11.1 | 11.2 | 11.5 | 11.4 | 11.5 | 11.3 | 11.2 | 11.1 | 11.2 | 11.5 |

Note:
*Part(s) by weight per 100 parts by weight of Pellet I.
**Part(s) by weight per 100 parts by weight of Pellet II.

Table 1 shows Examples and Comparative Examples in which a propylene homopolymer is used as a propylene polymer. In Examples 1 to 15, Compound A, a phenolic antioxidant, and a radical generator are compounded with the propylene homopolymer having a titanium content of 30 ppm as a catalyst residue, and the mixture is modified by melt-kneading. In Comparative Examples 1 and 2, a phosphorus antioxidant is used as a coloration preventing agent. In Comparative Example 3, the propylene homopolymer is mixed with a partial ester of a polyol and a fatty acid, a phenolic antioxidant, and a radical generator, followed by modification by melt-kneading as taught in Japanese Patent Application (OPI) Nos. 252443/87 and 12650/88 previously proposed by the present inventors. As can be seen from Table 1, the modified propylene polymer compositions obtained in Examples 1 to 15 are less colored than those of Comparative Examples 1 to 3. To the contrary, the modified propylene polymer compositions of Comparative Examples 1 and 2 in which a phosphorus antioxidant is used in place of Compound A significantly suffer coloration. Further, the modified propylene polymer compositions of Examples 1 to 15 prove to exhibit further improved freedom from coloration over that of Comparative Example 3 using a partial ester of a polyol and a fatty acid. On comparing Examples 1 to 15 with Comparative Examples 4 to 7 wherein a zinc compound other than Compound A is used, it is apparent that the modified propylene polymer compositions of the latter enjoy virtually no improvement on color protection. On looking at Examples 9 and 10 wherein a phosphorus antioxidant is used in combination with the system according to the present invention in view of Example 6, it is recognized that such a combined use produces a significant synergistic effect without impairing the excellent color protection effect of the Compound A. Furthermore, as can be seen from Table 1, the modified propylene polymer compositions obtained in Examples 1 to 15 and Comparative Examples 1 to 7 in which a radical generator is used each has the improved moldability.

Tables 2 to 5 shows examples using, as a propylene polymer, a crystalline ethylene-propylene random copolymer, a crystalline ethylene-propylene block copolymer, a crystalline ethylene-propylene-butene-1 terpolymer, and a crystalline ethylene-propylene block copolymer, respectively. As can be seen from these tables, the similar effects as observed in Table 1 were confirmed.

Table 6 shows examples and comparative examples using a propylene homopolymer as a propylene polymer. In Examples 76 to 90, a propylene homopolymer containing 30 ppm of a titanium content having compounded therein a phenolic antioxidant and a radical generator is melt-kneaded, and the thus modified propylene homopolymer composition is again melt-kneaded in the presence of Compound A.

On comparing Examples 76 to 90 with Comparative Examples 36 to 42 using a phosphorus antioxidant, a partial ester of a polyol and a fatty acid, or a zinc compound other than Compound A in place of Compound A, it is revealed that, though Pellets I of Examples 76 to 90 are considerably colored, Pellets II obtained through the follow-up melt-kneading in the presence of Compound A are markedly protected against coloring. In contrast, both Pellets I and II obtained in Comparative Examples 36 to 42 suffer serious coloring. In particular, Pellet II obtained by using the phosphorus antioxidant, the partial ester of a polyol and a fatty acid or the zinc compound other than Compound A in place of Compound A is not only protected from coloring but also greatly colored through the two melt-kneading treatments, i.e., thermal history. Furthermore, as can be seen from Table 6, both Pellets I and II obtained in Examples 76 to 90 and Comparative Examples 36 to 42 in which a radical generator is used each has improved moldability.

Table 7 indicates cases of using a crystalline ethylene-propylene block copolymer. Similar effects as observed in Table 6 were recognized in these cases.

Accordingly, it has now been proved that the modified propylene polymer compositions obtained by the process of the present invention are free from coloration and have improved moldability.

As described above, the process of the present invention provides modified propylene polymer compositions which are greatly superior in freedom from coloring to those obtained by modifying a propylene polymer composition containing a compound conventionally known to have color protection effects and a phenolic antioxidant by melt-kneading in the presence of a radical generator or those obtained by modifying a propylene polymer composition containing a phenolic antioxidant by melt-kneading in the presence of a radical generator and then further melt-kneading the thus modified propylene polymer composition in the presence of a compound known to have color protection effects.

While the invention has been described in detail and with reference to specific embodiments thereof, it will be apparent to one skilled in the art that various changes and modifications can be made therein without departing from the spirit and scope thereof.

What is claimed is:

1. A process for producing a modified propylene polymer composition, with propylene polymers having 5 ppm or more of a titanium content or 0.5 ppm or more of a vanadium content as a catalyst residue, which comprises compounding at least 0.01 parts by weight of a zinc salt of carboxylic acid, at least 0.01 parts by weight of a phenolic antioxidant, and from 0.001 to 0.5 part by weight of a radical generator with 100 parts by weight of a propylene polymer and melt-kneading the resulting mixture at a temperature of from 150° C. to 300° C.

2. A process as claimed in claim 1, wherein said zinc salt of a carboxylic acid is at least one of zinc salts of a fatty acid and zinc salts of an aromatic carboxylic acid.

3. A process as claimed in claim 1, wherein said zinc salt of a carboxylic acid is at least one of zinc 2-ethylhexanoate, zinc stearate, and zinc montanate.

4. A process as claimed in claim 1, wherein said phenolic antioxidant is at least one of 2,6-di-t butyl-p-cresol, tetrakis[methylene-3-(3′,5′-di-t-butyl-4′-hydroxyphenyl)propionate]methane, 1,3,5-trimethyl-2,4,6-tris(3,5-di-t-butyl-4-hydroxybenzyl)benzene, 1,3,5-tris(3,5-di-t-butyl-4-hydroxybenzyl) isocyanurate, and n-octadecyl-β(4′-hydroxy-3′,5′-di-t-butylphenyl)propionate.

5. A process as claimed in claim 1, wherein said radical generator is at least one of 2,5-dimethyl-2,5-di-(t-butylperoxy)hexane, 2,5-dimethyl-2,5-di-(t-butylperoxy)hexyne-3, and 1,3-bis(t-butylperoxyisopropyl)benzene.

6. A process as claimed in claim 1, wherein said propylene polymer is at least one of a propylene homopolymer, a crystalline ethylene-propylene random copolymer, a crystalline ethylene-propylene block copolymer, a crystalline propylene-butene-1 random copolymer, a crystalline ethylene-propylene-butene-1 terpolymer, and a crystalline propylene-hexene-butene-1 terpolymer.

7. A process for producing a modified propylene polymer composition with a propylene polymer having 5 ppm or more of a titanium content or 0.5 ppm or more of a vanadium content as a catalyst residue, which comprises compounding at least 0.01 parts by weight of a phenolic antioxidant and from 0.001 to 0.5 part by weight of a radical generator with 100 parts by weight of a propylene polymer, melt-kneading the mixture at a temperature of from 150° C. to 300° C., compounding at least 0.01 parts by weight of zinc salt of a carboxylic acid per 100 parts by weight of the propylene polymer with the resulting modified propylene polymer composition, and again subjecting the resulting mixture to melt-kneading at a temperature of from 150° C. to 300° C.

8. A process as claimed in claim 7, wherein said zinc salt of a carboxylic acid is at least one of zinc salts of a fatty acid and zinc salts of an aromatic carboxylic acid.

9. A process as claimed in claim 7, wherein said zinc salt of a carboxylic acid is at least one of zinc 2-ethylhexanoate, zinc stearate, and zinc montanate.

10. A process as claimed in claim 7, wherein said phenolic antioxidant is at least one of 2,6-di-t-butyl-p-cresol, tetrakis[methylene-3-(3′,5′-di-t-butyl-4′-hydroxyphenyl)propionate]methane, 1,3,5 trimethyl-2,4,6-tris(3,5-di-t-butyl-4-hydroxybenzyl)benzene, 1,3,5-tris(3,5-di-t-butyl-4-hydroxybenzyl) isocyanurate, and n-octadecyl-$\beta$(4′-hydroxy-3′,5′-di-t-butylphenyl) propionate.

11. A process as claimed in claim 7, wherein said radical generator is at least one of 2,5-dimethyl-2,5-di-(t-butylperoxy)hexane, 2,5-dimethyl-2,5-di-(t-butyl-peroxy)hexyne-3, and 1,3-bis(t-butylperoxyisopropyl)benzene.

12. A process as claimed in claim 7, wherein said propylene polymer is at least one of a propylene homopolymer, a crystalline ethylene-propylene random copolymer, a crystalline ethylene-propylene block copolymer, a crystalline ethylene-propylene block copolymer, a crystalline propylene-butene-1 random copolymer, a crystalline ethylene-propylene-butene-1 terpolymer, and a crystalline propylene-hexene-butene-1 terpolymer.

13. A process as claimed in claim 1 wherein said zinc salt is present in an amount of 0.01 to 1 part by weight.

14. A process as claimed in claim 7 wherein said zinc salt is present in an amount of 0.01 to 1 part by weight.

15. A process as claimed in claim 1 wherein said phenolic antioxidant is present in an amount of 0.01 to 1 part by weight.

16. A process as claimed in claim 7 wherein said phenolic antioxidant is present in an amount of 0.01 to 1 part by weight.

* * * * *

UNITED STATES PATENT AND TRADEMARK OFFICE
CERTIFICATE OF CORRECTION

PATENT NO. : 4,923,918
DATED : May 8, 1990
INVENTOR(S) : Komori et al.

It is certified that error appears in the above-identified patent and that said Letters Patent is hereby corrected as shown below:

Column 26, line 54, change "2,6-di-t butyl-p-cresol" to --2,6-di-t-butyl-p-cresol--;

lines 59 and 60, change "n-octadecyl-β(4'-hydroxy-3',5'-di-t-butylphenyl)propionate" to --n-octadecyl-β-(4'-hydroxy-3',5'-di-t-butylphenyl)propionate--.

Column 27, line 30, change "1,3,5 trimethyl-2,4,6-" to --1,3,5-trimethyl-2,4,6---.

Column 28, lines 3 and 4, change "n-octadecyl-β(4'-hydroxy-3',5'-di-t-butylphenyl) propionate" to --n-octadecyl-β-(4'-hydroxy-3',5'-di-t-butylphenyl)propionate--;

lines 14 and 15, delete "a crystalline ethylene-propylene block copolymer".

Signed and Sealed this

Twenty-seventh Day of August, 1991

Attest:

HARRY F. MANBECK, JR.

Attesting Officer

Commissioner of Patents and Trademarks